(12) United States Patent
Harel et al.

(10) Patent No.: US 8,811,522 B2
(45) Date of Patent: Aug. 19, 2014

(54) MITIGATING INTERFERENCES FOR A MULTI-LAYER MIMO SYSTEM AUGMENTED BY RADIO DISTRIBUTION NETWORK

(71) Applicant: Magnolia Broadband Inc., Englewood, NJ (US)

(72) Inventors: Haim Harel, New York, NY (US); Eduardo Abreu, Allentown, PA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/068,863

(22) Filed: Oct. 31, 2013

(65) Prior Publication Data

US 2014/0056378 A1    Feb. 27, 2014

Related U.S. Application Data

(63) Continuation-in-part of application No. 13/630,146, filed on Sep. 28, 2012.

(60) Provisional application No. 61/652,743, filed on May 29, 2012, provisional application No. 61/657,999, filed on Jun. 11, 2012, provisional application No. 61/658,015, filed on Jun. 11, 2012, provisional application No. 61/665,592, filed on Jun. 28, 2012.

(51) Int. Cl.
| | | |
|---|---|---|
| *H04B 7/02* | (2006.01) | |
| *H04B 7/04* | (2006.01) | |
| *H04B 7/08* | (2006.01) | |

(52) U.S. Cl.
CPC ............. *H04B 7/0408* (2013.01); *H04B 7/086* (2013.01)
USPC ........................... 375/267; 375/260; 375/259

(58) Field of Classification Search
CPC ........................................................ H04B 1/109
USPC .......................................... 375/267, 260, 259
See application file for complete search history.

(56) References Cited

U.S. PATENT DOCUMENTS

| | | |
|---|---|---|
| 4,044,359 A | 8/1977 | Applebaum et al. |
| 4,079,318 A | 3/1978 | Kinoshita |

(Continued)

FOREIGN PATENT DOCUMENTS

| | | |
|---|---|---|
| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Michael Neff
(74) *Attorney, Agent, or Firm* — Pearl Cohen Zedek Latzer Baratz LLP (57) ABSTRACT

A wireless User Equipment (UE) receiving system, may include tunable receiving antennas; a channel estimation module configured to: carry out a periodic, non-continuous channel estimation to a plurality of desired signals and undesired co-channel downlink signals which are transmitted from different base stations and received by said plurality of antennas, causing interference; wherein the UE receiving system is configured to select between: tuning said plurality of tunable receiving antennas so as to maximize the total average power of said desired signals; and tuning said plurality of tunable receiving antennas so as to minimize the total average power of the strongest undesired co-channel base station's signals. Alternatively, the tuning is carried out so as to maximize a power ratio between said desired signals and a combination of said undesired co-channel downlink signals having the strongest interference level and an internal noise of the receiving system.

15 Claims, 6 Drawing Sheets

(56) References Cited

U.S. PATENT DOCUMENTS

| | | |
|---|---|---|
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,940,033 A | 8/1999 | Locher et al. |
| 6,018,317 A | 1/2000 | Dogan et al. |
| 6,046,655 A | 4/2000 | Cipolla |
| 6,101,399 A * | 8/2000 | Raleigh et al. ............... 455/561 |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,297,772 B1 | 10/2001 | Lewis |
| 6,321,077 B1 | 11/2001 | Saitoh et al. |
| 6,377,783 B1 | 4/2002 | Lo et al. |
| 6,584,115 B1 | 6/2003 | Suzuki |
| 6,697,633 B1 | 2/2004 | Dogan et al. |
| 6,834,073 B1 | 12/2004 | Miller et al. |
| 6,927,646 B2 | 8/2005 | Niemi |
| 6,975,582 B1 | 12/2005 | Karabinis et al. |
| 6,987,958 B1 | 1/2006 | Lo et al. |
| 7,068,628 B2 | 6/2006 | Li et al. |
| 7,177,663 B2 | 2/2007 | Axness et al. |
| 7,257,425 B2 | 8/2007 | Wang et al. |
| 7,299,072 B2 | 11/2007 | Ninomiya |
| 7,392,015 B1 | 6/2008 | Farlow et al. |
| 7,499,109 B2 | 3/2009 | Kim et al. |
| 7,606,528 B2 | 10/2009 | Mesecher |
| 7,719,993 B2 | 5/2010 | Li et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 7,970,366 B2 | 6/2011 | Arita et al. |
| 8,078,109 B1 | 12/2011 | Mulcay |
| 8,115,679 B2 | 2/2012 | Falk |
| 8,155,613 B2 | 4/2012 | Kent et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,509,190 B2 | 8/2013 | Rofougaran |
| 8,520,657 B2 | 8/2013 | Rofougaran |
| 8,526,886 B2 | 9/2013 | Wu et al. |
| 8,599,955 B1 | 12/2013 | Kludt et al. |
| 8,599,979 B2 | 12/2013 | Farag et al. |
| 8,649,458 B2 | 2/2014 | Kludt et al. |
| 2001/0029326 A1 | 10/2001 | Diab et al. |
| 2001/0038665 A1 | 11/2001 | Baltersee et al. |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2003/0114162 A1 | 6/2003 | Chheda et al. |
| 2003/0153322 A1 | 8/2003 | Burke et al. |
| 2003/0203717 A1 | 10/2003 | Chuprun et al. |
| 2004/0056795 A1 | 3/2004 | Ericson et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0166902 A1 | 8/2004 | Castellano et al. |
| 2004/0228388 A1 | 11/2004 | Salmenkaita |
| 2004/0235527 A1 | 11/2004 | Reudink et al. |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0129155 A1 | 6/2005 | Hoshino |
| 2005/0147023 A1 | 7/2005 | Stephens et al. |
| 2005/0245224 A1 | 11/2005 | Kurioka |
| 2005/0250544 A1 | 11/2005 | Grant et al. |
| 2005/0287962 A1 | 12/2005 | Mehta et al. |
| 2006/0041676 A1 | 2/2006 | Sherman |
| 2006/0094372 A1 * | 5/2006 | Ahn et al. ............... 455/67.13 |
| 2006/0135097 A1 | 6/2006 | Wang et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0076675 A1 | 4/2007 | Chen |
| 2007/0093261 A1 | 4/2007 | Hou et al. |
| 2007/0152903 A1 | 7/2007 | Lin et al. |
| 2007/0223380 A1 | 9/2007 | Gilbert et al. |
| 2008/0043867 A1 | 2/2008 | Blanz et al. |
| 2008/0051037 A1 | 2/2008 | Molnar et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0280571 A1 | 11/2008 | Rofougaran et al. |
| 2008/0285637 A1 | 11/2008 | Liu et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0154419 A1 | 6/2009 | Yoshida et al. |
| 2009/0190541 A1 | 7/2009 | Abedi |
| 2009/0268616 A1 | 10/2009 | Hosomi |
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0105036 A1 | 5/2011 | Rao et al. |
| 2011/0150050 A1 | 6/2011 | Trigui et al. |
| 2011/0150066 A1 | 6/2011 | Fujimoto |
| 2011/0163913 A1 | 7/2011 | Cohen et al. |
| 2011/0205883 A1 | 8/2011 | Mihota |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0064838 A1 | 3/2012 | Miao et al. |
| 2012/0076028 A1 | 3/2012 | Ko et al. |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270544 A1 | 10/2012 | Shah |
| 2012/0314570 A1 | 12/2012 | Forenza et al. |
| 2013/0010623 A1 | 1/2013 | Golitschek |
| 2013/0023225 A1 | 1/2013 | Weber |
| 2013/0051283 A1 | 2/2013 | Lee et al. |
| 2013/0070741 A1 | 3/2013 | Li et al. |
| 2013/0079048 A1 | 3/2013 | Cai et al. |

(56) References Cited

U.S. PATENT DOCUMENTS

| | | |
|---|---|---|
| 2013/0094621 A1 | 4/2013 | Luo et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208619 A1 | 8/2013 | Kudo et al. |
| 2013/0223400 A1 | 8/2013 | Seo et al. |
| 2013/0242976 A1 | 9/2013 | Katayama et al. |
| 2013/0272437 A1 | 10/2013 | Eidson et al. |
| 2013/0331136 A1 | 12/2013 | Yang et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.

* cited by examiner

MITIGATING INTERFERENCES FOR A MULTI-LAYER MIMO SYSTEM AUGMENTED BY RADIO DISTRIBUTION NETWORK

CROSS-REFERENCE TO RELATED APPLICATIONS

This application is a continuation-in-part application of U.S. patent application Ser. No. 13/630,146, filed on Sep. 28, 2012, which claims the benefit of U.S. Provisional Patent Application No. 61/652,743, filed on May 29, 2012, U.S. Provisional Patent Application No. 61/657,999, filed on Jun. 11, 2012, U.S. Provisional Patent Application No. 61/658,015, filed on Jun. 11, 2012, and U.S. Provisional Patent Application No. 61/665,592, filed on Jun. 28, 2012, all of which are incorporated herein by reference in their entirety.

FIELD OF THE INVENTION

The present invention relates generally to the field of radio frequency (RF) multiple-input-multiple-output (MIMO) systems and more particularly to systems and methods for RF MIMO systems using RF beamforming and/or digital signal processing, to augment the receiver performance.

BACKGROUND

Prior to setting forth a short discussion of the related art, it may be helpful to set forth definitions of certain terms that will be used herein.

The term "cell" as used herein, in the context of cellular communication, is a land area served by at least one fixed-location transceiver, known as a cell site or base station. In a cellular network, each cell may use a different set of frequencies than that used by neighboring cells for cell-edge UEs, to avoid inter-cell interference becoming the limiting factor of system throughput.

The term multiple input multiple output or "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

The term "Receiving Radio Distribution Network" or "Rx RDN" or simply "RDN" as used herein is defined as a group of beamformers as set forth above.

The term "hybrid MIMO RDN" as used herein is defined as a MIMO system that employs two or more antennas per channel (N is the number of channels and M is the total number of antennas and M>N). This architecture employs a beamformer for each channel so that two or more antennas are combined for each radio circuit that is connected to each one of the channels.

Given a receiver which is equipped with more antennas than baseband supported receivers, these extra antennas are used to form an RF beamformer for each one of the receiver's inputs. When the phases of the received signals from each antenna connected to a receiver input are properly adjusted with respect to one another, the individual signals may be passively combined and result in an improved Signal to Interference plus Noise Ratio (SINR) for the receiving system.

Channel estimation can be used for adjusting the phases of the received signals in order to maximize the received power of a desired signal. However, channel estimation works well only when external noise is uncorrelated, and therefore may not be optimal for cases of correlated external noise. Specifically, at interference limited situations, further SINR improvement is possible when such interference is taken into account.

SUMMARY

Certain embodiments of the present invention are based on statistical knowledge of the interference and are generally applicable in the presence of a dominant strong and persisting interference (e.g., a neighboring base station). Such knowledge may be obtained by the user equipment (UE) via channel estimation of a dominant neighboring cell, either when instructed by the serving cell to do so, or autonomously at idle moments. User equipment ("UE" or "a UE") may be a device such as a cellular telephone, wireless-capable computer or laptop computer, smartphone, or other wireless or cellular capable device.

Certain embodiments of the present invention provide a wireless UE receiving system. The UE receiving system may include: a plurality of tunable receiving antennas; a channel estimation module configured to: carry out or execute a periodic (repeating the process every predefined period of time), non-continuous (as opposed to a continuous channel estimation in which SINR values are monitored throughout the entire period) channel estimation on a plurality of a desired and undesired co-channel downlink signals which are transmitted from different base stations and received by said plurality of antennas; determine the interference level of all interfering base stations, wherein the interference level of a base station is the total average power, detected at the UE antennas and before the antenna signals are combined, of all undesired co-channel downlink signals originated at said base station; select, determine or identify the undesired co-channel downlink signals having the strongest interference level, wherein signals having the strongest interference level are the signals originated at the strongest interfering base station, i.e., the signals originated at the base station having the strongest interference level.

In one embodiment, the UE receiving system is configured to choose or select between: tuning said plurality of tunable receiving antennas so as to maximize the total average power of said desired signals; and tuning said plurality of tunable receiving antennas so as to minimize the total average power of the determined undesired co-channel downlink signals having the strongest interference level.

In another embodiment, the UE receiving system is configured to tune said plurality of tunable receiving antennas so as to maximize a ratio between the total average power of said desired signals and a combination of the total average power of said undesired co-channel downlink signals having the strongest interference level and an internal noise of the UE receiving system.

Normally, UEs are either engaged in communications with their serving base station, or go to idle mode in order to conserve energy; from time to time however, a UE will scan other base stations transmission for potential system directed handover; such scans also provide an indication of co-channel interference, and so can be utilized to identify and channel estimate a possible close by non-serving co-channel base station, or other strong interferer. As it is assumed that the update rate of such interference channel estimation is subjected to some limitations related to computational constraints, battery life and traffic load, such interference estimation and SINR measurement validity and accuracy is subjected to update rate, which may be lower than the desired signal' channel estimation and SINR measurement. Therefore, a so-called 'sanity check' may be carried out before applying weights, as described below.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

The drawings together with the following detailed description make the embodiments of the invention apparent to those skilled in the art.

DETAILED DESCRIPTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 1:
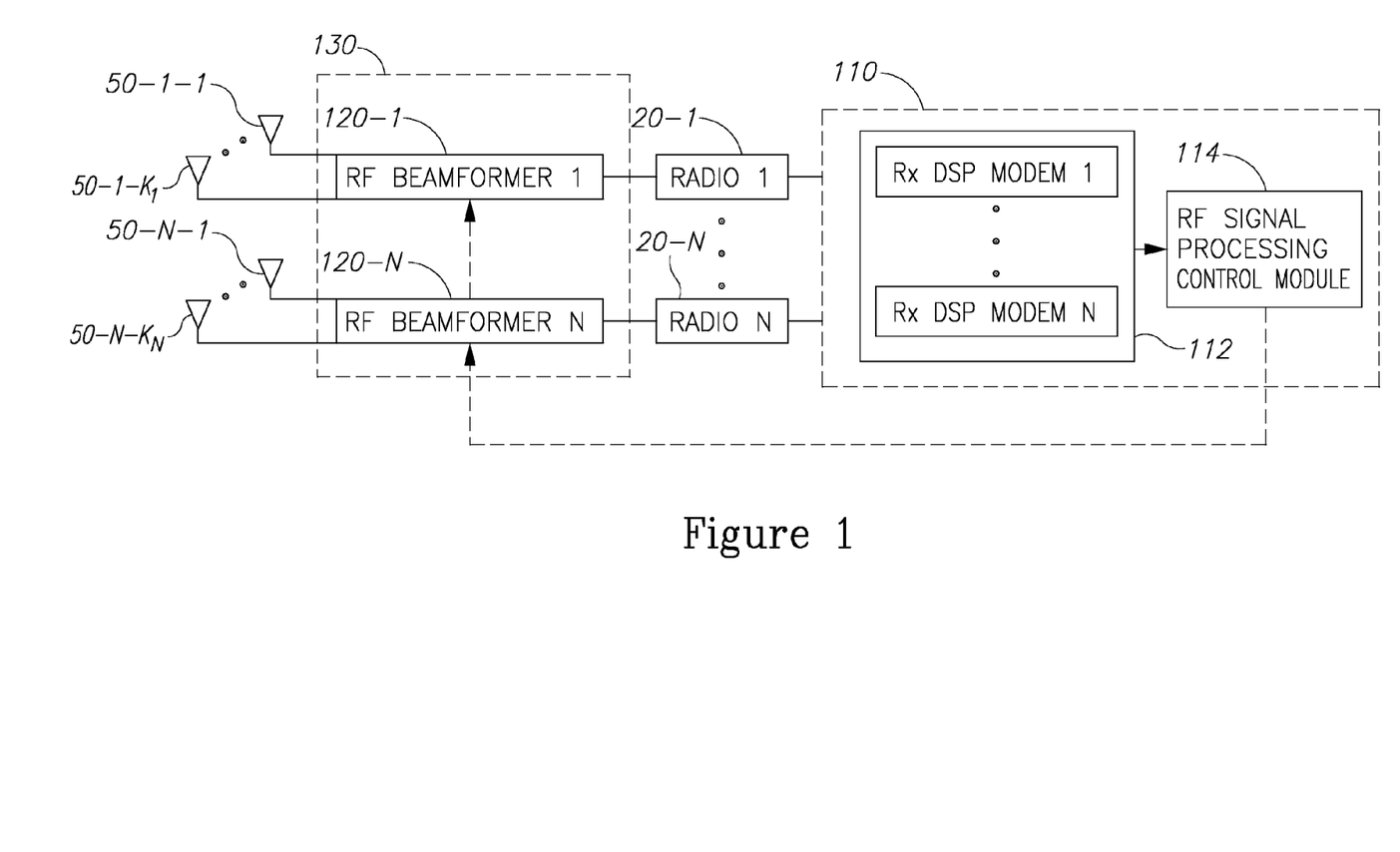
FIG. 1 is a block diagram illustrating a system in accordance with some embodiments of the present invention.

FIG. 1 depicts a hybrid of a MIMO receiver system comprising a number of radios, baseband DSP modems and an array of RF beamformers, in accordance with some embodiments of the present invention. Baseband processor 110, possibly in the form of an integrated circuit (IC), may include one or more legacy receiving DSP modems 112. Additionally, the baseband processor 110 may further include an RF signal processing control module 114. Baseband processor 110 is fed by two or more radio circuits 20-1 to 20-N, the outputs of which are input to the respective one or more legacy DSP receiving modems 112. Each one of radio circuits 20-1 to 20-N is fed in turn by a corresponding RF beamforming module (or RF beamformer) 120-1 to 120-N, which together form a receiving radio distribution network (Rx RDN) 130. Additionally, each one of RF beamforming modules 120-1 to 120-N is fed by a plurality of antennas such as 50-1-1 to 50-1-$K_1$ through 50-N-1 to 50-N-$K_N$ and may be further tunable by RF signal processing control module 114.

In operation, the Baseband DSP modems 112 and radios 20 may be configured to enhance the communication link via the addition of the Rx RDN and additional antennas. The enhancement may be accomplished by adding RF signal processing control module (or RF Control Module) 114. RF control module 114 may generate beamforming weights (i.e., amplitude and phase) based on various possible processing levels applied to signals obtained from DSP modems 112, and tunes the one or more RF beamforming modules 120-1 to 120-N. Control module 114 and/or processor 110 may be configured to, alone or in combination with other elements, carry out embodiments of the present invention, for example by being hard-wired to do so, and/or executing software or code causing the module 114 or processor 110 to do so.

By the aforementioned architecture, RF MIMO receiver systems can be retrofitted and augmented with additional antennas while preserving the legacy signal processing implementation, and reusing existing signals with additional processing, in order to tune additional RF circuitry, i.e., Rx RDN 130, thus enhancing performance.

Figure 2A:
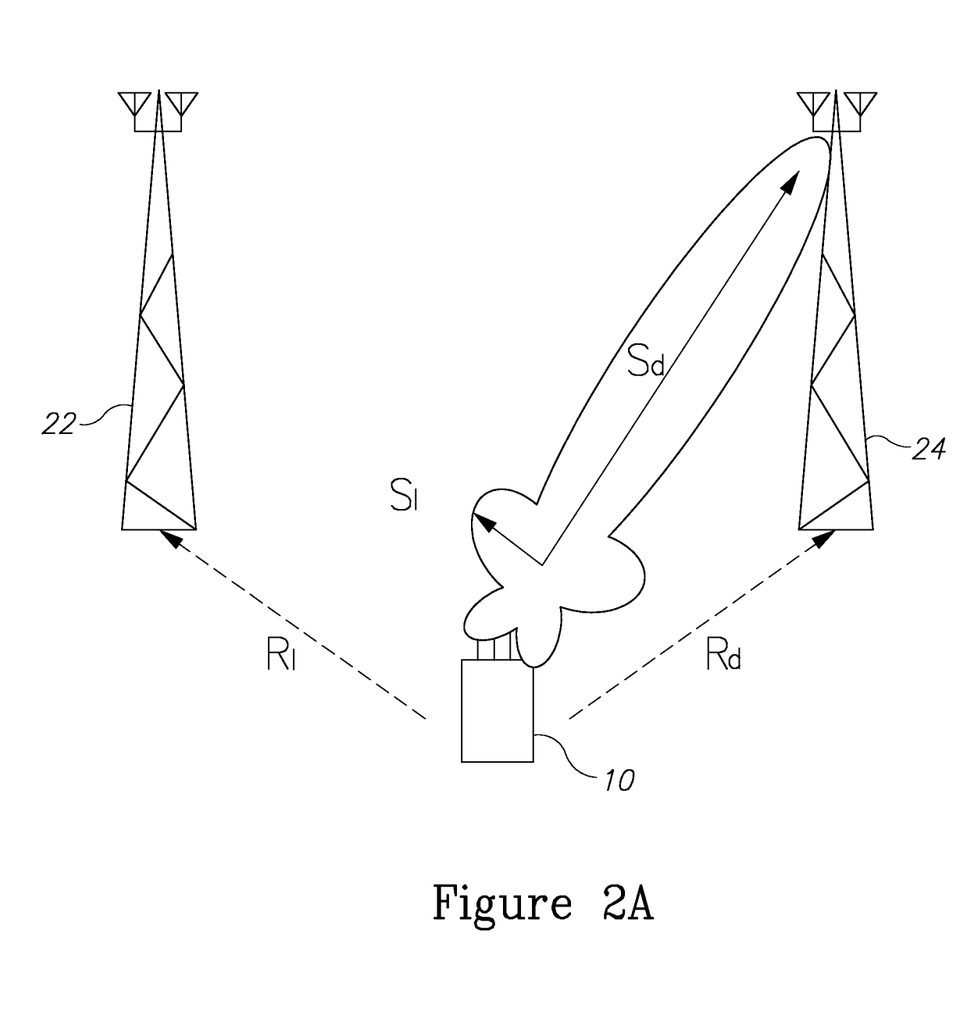
FIG. 2A depicts typical inter-cell interference where the UE tunes its beam towards the serving cell in accordance with some embodiments of the present invention.
Figure 2B:
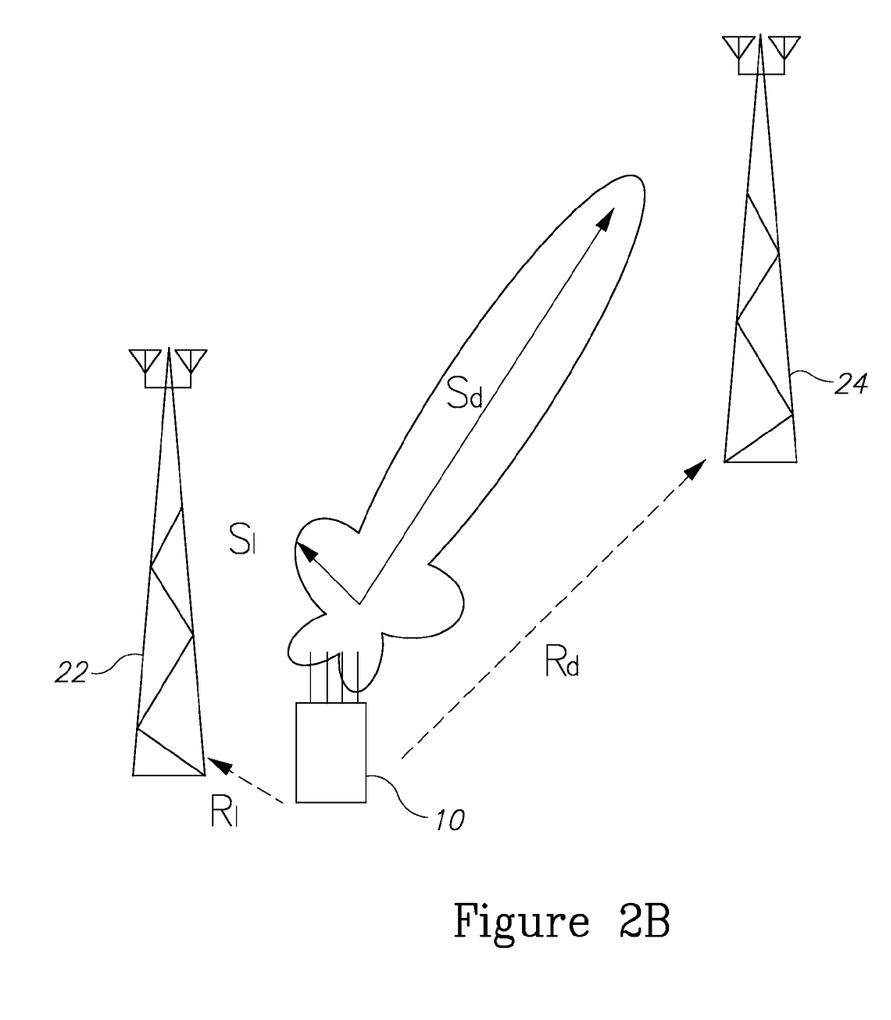
FIG. 2B depicts a UE served by a weak (e.g., distant or low power) cell, in the presence of strong interference (e.g., close by or high power cell) in accordance with some embodiments of the present invention.

FIG. 2A depicts typical inter-cell interference where the UE 10 tunes its beam towards the serving cell 24 located at a distance $R_d$ (radius desired) to receive a desired signal $S_d$. Due to its beam pattern, an interference signal $S_i$ from a neighboring cell 22 at a distance $R_i$ affects the received SINR. In this scenario, when $R_d > R_i$ and $S_d > S_i$, the total effect of $S_i$ on the SINR is usually negligible. However, as shown in FIG. 2B when a UE is served by a weak (distant or low power) cell, in the presence of strong interference (close by or high power cell) there is a need to deal with the interference signal.

One way to deal with this problem is to measure the two extreme cases by selecting two sets of phases, one that maximizes $S_d$ and another that minimizes $S_i$. Then, checking some qualitative criteria such as SINR, decide for the phases that produce or yield a better result.

A second way is to check several phases which do not necessarily reach the highest $S_d$ or the lowest $S_i$, but rather, provide a significant interference mitigation at a cost of some degrading of the desired signal.

According to some embodiments, the UE receiving system is a multiple input multiple output (MIMO) receiving system having number N channels, wherein each of the channels is associated with one of the beamformers and wherein the total number of said plurality of tunable receiving antennas is $$M = \sum_{j=1}^{N} K_j$$

wherein $K_j$ is a number of tunable antennas for the jth beamformer, wherein M is greater than N. The number of tunable antennas of a beamformer is also denoted by K wherein K may be different for each beamformer.

Figure 2C:
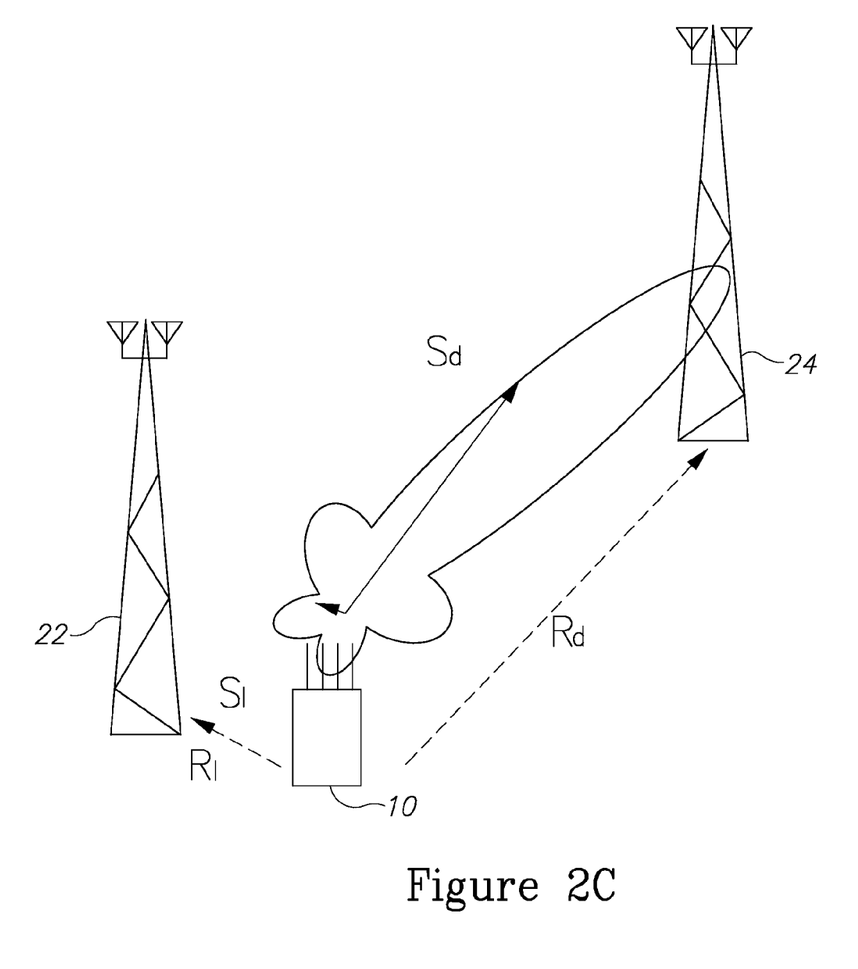
FIG. 2C describes a case where the UE beamforming finds an antenna pattern that nulls the interference while still maintaining sufficient desired signal in accordance with some embodiments of the present invention.

FIG. 2C describes such a case where the UE beamforming finds an antenna pattern that minimizes the undesired or not-desired signal having the strongest interference level while still maintaining sufficient desired signal. For example, an undesired or not-desired signal may significantly reduce the SINR because of the high interference level. For the purposes of embodiments of the present invention, desirability of a signal relates to the extent that the transmitted signal carries data streams intended for the receiver. It is well noted that the impact of mitigating the interference is much more effective than trying to increase the power of the desired signal and so efforts are directed at nulling the strongest interference signals while maintaining the desired signal at a sufficient level.

According to some embodiments of the present invention, control module 114 may be configured to for example: (a) carry out a periodic, non-continuous channel estimation on a plurality of desired signals and a plurality of undesired co-channel downlink signals which are transmitted from different base stations and received by said plurality of antennas; and (b) identify the undesired co-channel downlink signals having the strongest interference level, i.e., the signals originated at the base station that has the strongest interference level, wherein the interference level of a base station is defined as the total average power, at the UE antennas and before the antennas are combined, of all interference signals transmitted by the base station. Then the UE receiving system may be configured to select between: tuning said plurality of tunable receiving antennas so as to maximize the total average power of said desired signals; and tuning said plurality of tunable receiving antennas so as to minimize the total average power of the identified undesired co-channel downlink signals having the strongest interference level.

According to embodiments of the present invention control module 114 may be configured to for example: (a) carry out a periodic, non-continuous channel estimation on a plurality of a desired and undesired co-channel downlink signals which are transmitted from different base stations and received by said plurality of antennas; and (b) determine or identify the undesired co-channel downlink signals having the strongest interference level. The UE receiving system may then be configured to tune said plurality of tunable receiving antennas so as to maximize a ratio between the total average power of said desired signals and a combination of the total average power of said undesired co-channel downlink signals having the strongest interference level and an internal noise (e.g. a level of noise) of the UE receiving system.

According to some embodiments of the present invention, a multi-layer MIMO wireless communication system is provided with multiple transmit antennas and multiple receivers; each receiver may be connected to a beamformer having multiple receive antennas connected to it so that a beam is formed for each one of the receivers. For optimal performance the phases (and optionally the amplitudes) of the received signals from each antenna connected to a beamformer need to be properly adjusted.

For each beamformer there may be a set of optimal antenna weights (amplitudes and phases). The optimization of a beamformer with K receive antennas, where K may be different for each beamformer, is considered herein, such that each of the K receive antennas receives desired signals from P transmit antennas from a base station. The same optimization may be performed for all beamformers independently of one another using the same algorithm.

For each beamformer some definitions may be set forth:
$H_S$: K×P signal channel matrix from the P transmit antennas to the beamformer's K receive antennas;
$W_S$: P×U weight matrix applied to the signal by the transmitter, wherein U≤P;
$W_{BF}$: K×1 conjugate beamformer weight vector;
$PWR_{Signal}$: total average power of the beamformer's combined desired signals, defined hereinafter in Eq. (1) below:

$$PWR_{Signal} = W_{BF}^H H_S W_S W_S^H H_S^H W_{BF} \quad (1)$$

L: number of transmit antennas from the strongest interfering base station;
$H_I$: K×L interference channel matrix from the L interfering antennas to the beamformer's K receive antennas;
$W_I$: L×L weight matrix applied to the interference by the transmitter;
C: covariance matrix of external noise (noise added before the received signals are combined);
$\sigma_n^2$: variance or power of internal noise (noise added after the received signals are combined).
$PWR_{Interference}$: total average power of the beamformer's combined undesired signals, defined hereinafter in Eq. (2) below:

$$PWR_{interference} = W_{BF}^H H_I W_I W_I^H H_I^H W_{BF} \quad (2)$$

$PWR_{Interference+Noise}$: total average power of the beamformer's combined undesired signals plus noise, defined hereinafter in Eq. (3) below:

$$PWR_{Interference+Noise} = W_{BF}^H [H_I W_I W_I^H H_I^H + C] W_{BF} + \sigma_n^2 \quad (3)$$

In one embodiment, the system decides or chooses to either maximize the desired signal power $PWR_{Signal}$ and ignore the interference, or to minimize the interference power $PWR_{Interference}$ and get what is provided for the desired signal; that decision may be made by estimating the weight vector $W_{BF}$ that maximizes the desired signal power and then those that minimize the not-desired or undesired signal power, and comparing respective measured SINR.

In order to optimize the weight vector $W_{BF}$ with ith element $\alpha_i e^{j\Phi_i}$, i–1 . . . K, the following definitions may be made:
A: Set of R discrete phase values $\{\phi_1, \phi_2, \ldots, \phi_R\}$, for example $\{0, 90, 180, 270\}$ degrees; and
B: Set of T discrete amplitudes $\{\alpha_1, \alpha_2 \ldots \alpha_T\}$, for example $\{1, 0.5, 0\}$.

The optimization procedure to be carried out for each beamformer may include, for example:
For phase only optimization: For all i (1 to K) set $\alpha_i=1$ and determine or choose phases $\Phi_i \in A$ so as to maximize $PWR_{Signal}$ as defined above. Next, for all i (1 to K) set $\alpha_i=1$ and determine or choose phases $\Phi_i \in A$ so as to minimize $PWR_{Interference}$ as defined above. Compare the measured SINR for both sets of best phases (maximum and minimum $PWR_{Signal}$ and minimum $PWR_{Interference}$) and select or decide for the phases that produce or yield the highest measured SINR.

For both amplitude and phase optimization: For all i (1 to K) determine or choose amplitudes $\alpha_i \in B$ and phases $\Phi_i \in A$ so as to maximize $PWR_{Signal}$ as defined above. Next, for all i (1 to K) determine or choose amplitudes $\alpha_i \in B$ and phases $\Phi_i \in A$ so as to minimize as $PWR_{Interference}$ defined above. Compare the measured SINR for both sets of best amplitudes and phases and select or decide for those that produce or yield the highest measured SINR.

After applying the above to a single beamformer, the procedure may be repeated for all other beamformers. As with all series of operations described herein, other or different operations may be used.

The aforementioned embodiment is suboptimal since the receiver gets to select between no interference mitigation and maximum interference reduction. A more optimal solution may be a mix of the two, as discussed below.

In another embodiment a mathematical expression for SINR may be defined by Eq. (4) below:

$$SINR = \frac{PWR_{Signal}}{PWR_{Interference+Noise}} = \frac{W_{BF}^H H_S W_S W_S^H H_S^H W_{BF}}{W_{BF}^H [H_I W_I W_I^H H_I^H + C] W_{BF} + \sigma_n^2} \quad (4)$$

The optimization procedure according this embodiment may include the following:

For phase only optimization: For all i (1 to K) set $\alpha_i = 1$ and determine or choose phases $\Phi_i \in A$ so as to maximize the SINR expression as defined above.

For both amplitude and phase optimization: For all i (1 to K) choose amplitudes $\alpha_i \in B$ and phases $\Phi_i \in A$ so as to maximize the SINR expression as defined above.

Then after carrying out the optimization for a single beamformer, the optimization procedure is repeated for all other beamformers.

It should be noted that in some cases an expression for $W_{BF}$ that maximizes the SINR expression of Eq. (4) may be obtained analytically. Assuming $\sigma_n^2 = 0$, $W_{BF}$ is the solution of Eq. (5) below:

$$H_S W_S W_S^H H_S^H W_{BF} W_{BF}^H [H_I W_I W_I^H H_I^H + C] W_{BF} - W_{BF} \cdot H_S W_S W_S^H H_S^H W_{BF} [H_I W_I W_I^H H_I^H + C] W_{BF} = 0 \quad (5)$$

For example, assuming $W_S$ has dimension P×1, $W_{BF}$ can be expressed as in Eq. (6) below:

$$W_{BF} = k[H_I W_I W_I^H H_I^H + C]^{-1} H_S W_S \quad (6)$$

wherein k is a constant value that does not affect the SINR.

In accordance with some embodiments of the present invention, a so-called "sanity check" may be performed periodically in order to verify that the optimization procedure is still valid, given the changes to the channel that may have occurred and that channel estimation on the interference may be done less frequently than channel estimation on the signals. To carry out a 'sanity check', Wx denotes the beamformer antenna weights selected for improving the desired signals, and Wy denotes the beamformer antenna weights selected for reducing the strongest interference or maximizing the power ratio between the desired signals and strongest interference plus internal noise. First, the SINR for Wx and Wy are measured and compared. If the SINR for Wy is greater than the SINR for Wx, then Wy is selected, otherwise Wx is used temporarily or until it is determined that updated interference estimation may be available.

Operational mode—the UE may be capable of performing monitoring measurements both on the serving cell and on neighboring cells which use the same carrier frequency as the serving cell such as: Long Term Evolution (LTE) reference signal received power (RSRP) and reference signal received quality (RSRQ) measurements, and performing channel estimation for interference estimation during intra-frequency monitoring measurements without the need for additional receiving resources; it captures the channel information and tuning parameters, and stores them so that when switching to neighbors and back it uses them as first cut for minimization of synchronization time. To perform RSRP and RSRQ measurements the UE may first synchronize to and determine the cell identification (ID) of the neighbor cells. Contrary to previous 3GPP systems, an LTE UE has to be able to perform the search without an explicit neighbor cell list provided. The intra-frequency measurement period is defined to be 200 ms in one embodiment. When no measurement gaps are activated, the UE shall be capable of performing RSRP and RSRQ measurements for, for example, 8 identified-intra-frequency cells and the UE physical layer shall be capable of reporting measurements to higher layers with the measurement period of, for example, 200 ms. Note that even when monitoring gap patterns are activated for inter-frequency and inter-RAT monitoring, the vast majority of time (i.e. no less than 85-90% of the time for a, for example, 6 ms monitoring gap over period of, for example, 40 ms or 80 ms) is available to perform intra-frequency monitoring. During monitoring gaps per eNodeB instruction, the UE may leave its serving cell and performs inter-frequency neighbors monitoring.

Figure 3A:
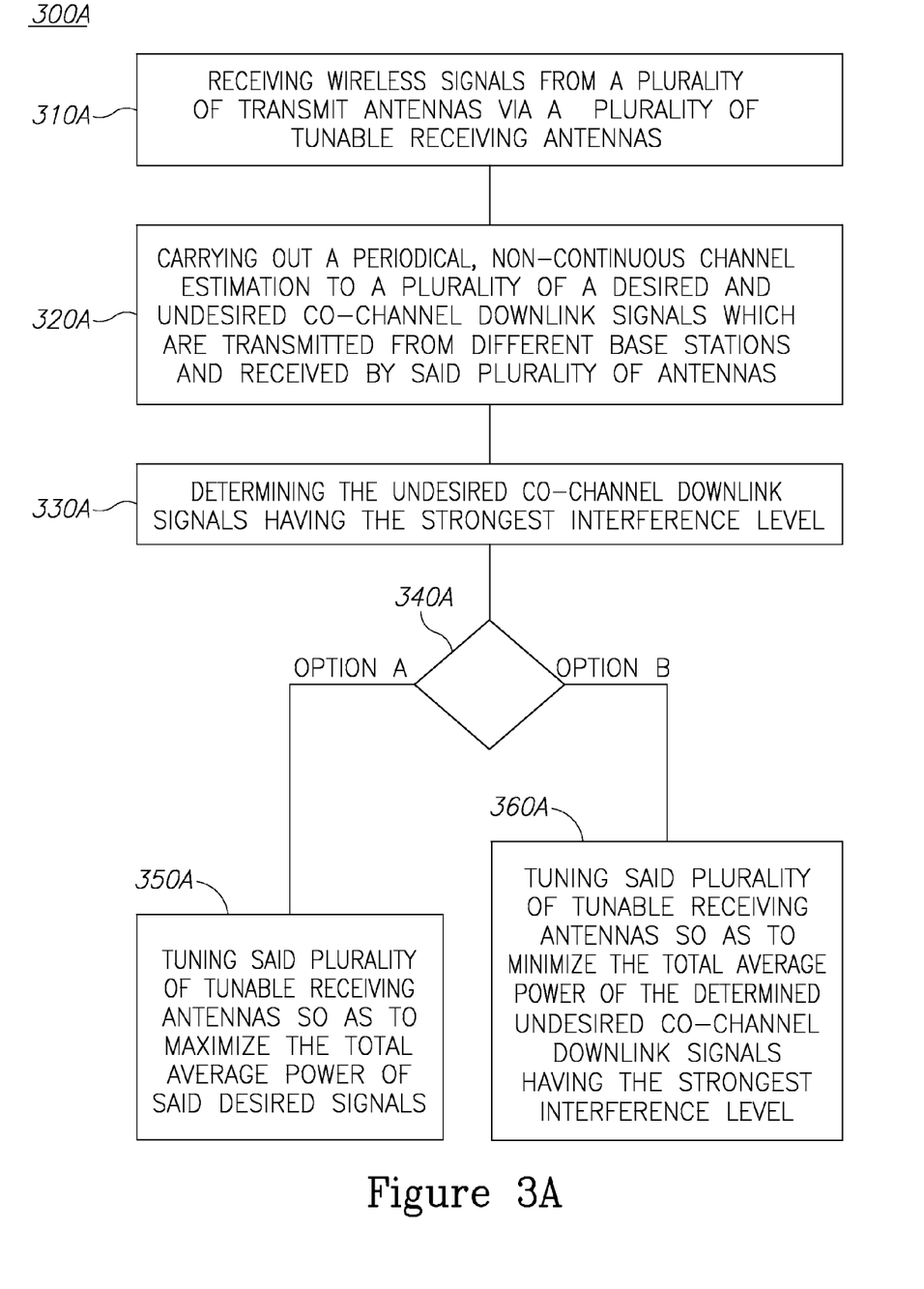
FIG. 3A is a high level flowchart illustrating a method in accordance with some embodiments of the present invention.

FIG. 3A is a high level flowchart illustrating a method 300A in accordance with some embodiments of the present invention. It is understood that method 300A may be implemented by any architecture and is not limited to the architecture illustrated in FIG. 1. Method 300A may include for example: receiving wireless signals from a plurality of transmit antennas via a plurality of tunable receiving antennas 310A; carrying out or executing a periodic (e.g., repeated or iterated over a specified time cycle), non-continuous channel estimation (on a plurality of a desired and not desired or undesired co-channel downlink signals which are transmitted from different base stations and received by said plurality of antennas 320A; determining or identifying the undesired co-channel downlink signals having the strongest interference level 330A and selecting 340A between option A and option B: tuning said plurality of tunable receiving antennas so as to maximize the total average power of said desired signals 350A; and tuning said plurality of tunable receiving antennas so as to minimize the total average power of the identified, selected or determined undesired co-channel downlink signals having the strongest interference level 360A.

Figure 3B:
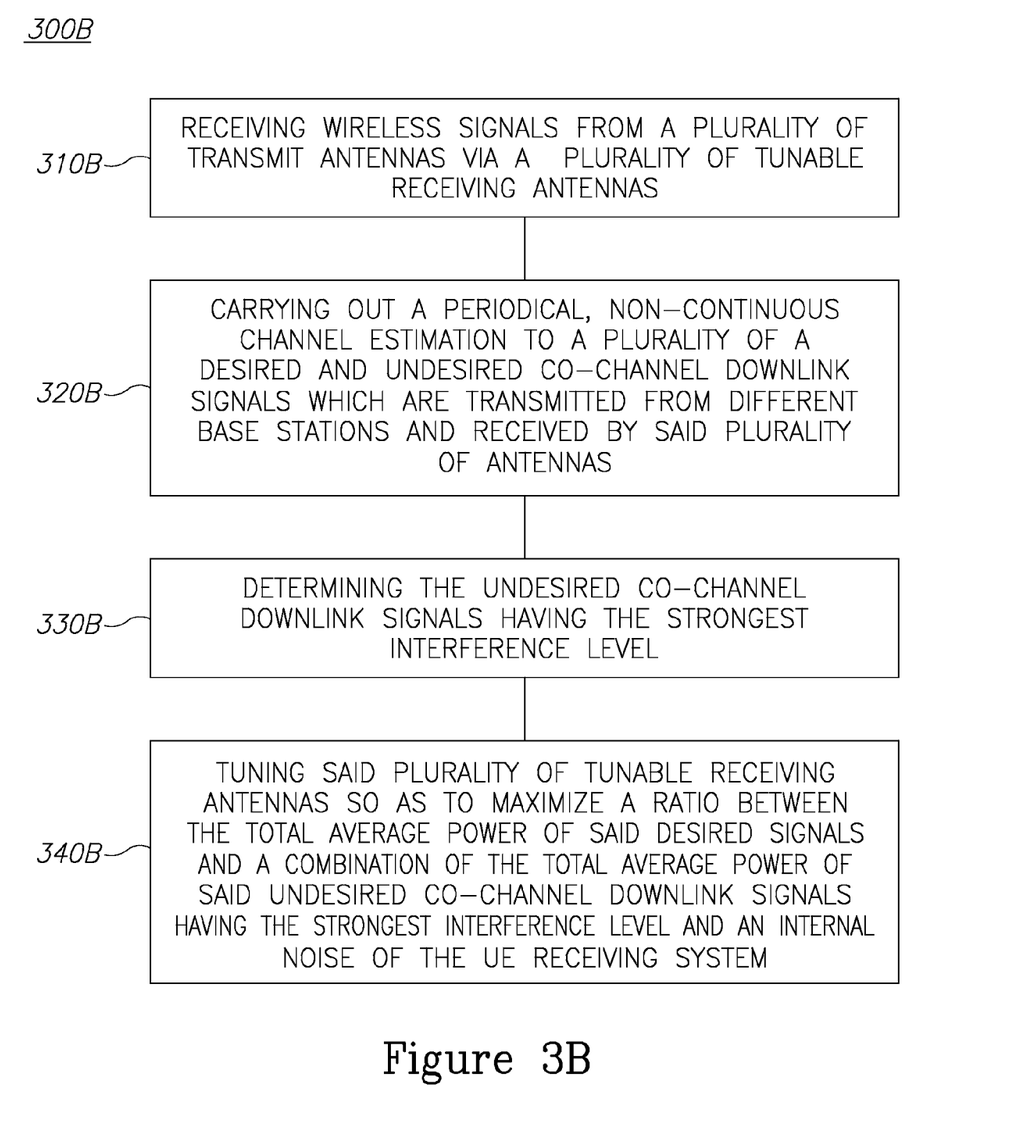
FIG. 3B is a high level flowchart illustrating yet another method in accordance with some embodiments of the present invention.

FIG. 3B is a high level flowchart illustrating another method 300B in accordance with some embodiments of the present invention. It is understood that method 300B may be implemented by any architecture and is not limited to the aforementioned architecture illustrated in FIG. 1. Method 300B may include the following steps: receiving wireless signals from a plurality of transmit antennas via a plurality of tunable receiving antennas 310B; carrying out a periodic, non-continuous channel estimation on a plurality of a desired and undesired co-channel downlink signals which are transmitted from different base stations and received by said plurality of antennas 320B; determining or identifying the undesired co-channel downlink signals having the strongest interference level 330B; and tuning said plurality of tunable receiving antennas so as to maximize a ratio between the total average power of said desired signals and a combination of the total average power of said undesired or not-desired co-channel downlink signals having the strongest interference level and an internal noise of the UE receiving system 340B.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In various embodiments, computational modules may be implemented by e.g., processors (e.g., a general purpose computer processor or central processing unit executing code or software), or digital signal processors (DSPs), or other circuitry. Such a processor or DSP may be for example control module 114, processor 110, or other components. The formulas and algorithms described herein can be calculated and implemented for example by software running on general purpose processor, e.g., control module 114 or processor 110. Beamformers, gain controllers, switches, combiners, and phase shifters may be implemented, for example using RF circuitries.

When non-serving base stations' channel estimation and SINR measurement are performed by the UE at a lower update rate than the serving cell's estimation and measurements, and when the results indicate the weight selection should lean towards reducing the interference rather than maximizing serving cell's power, such an interference reduction weight setting is recorded and at the next timeslot the UE's baseband processing may repeat SINR comparison between serving cell power maximizing weights setting (updated every time slot) and interference reduction weights setting (estimated at some past time), and select the better alternative. This past weight setting decision validation versus current status is referred to as "sanity check"

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A wireless User Equipment (UE) receiving system comprising:
    two or more beamformers, each beamformer having a plurality of tunable receiving antennas; and
    a control module configured to:
        carry out a periodic, non-continuous channel estimation on a plurality of desired signals and a plurality of undesired co-channel downlink signals which are transmitted from different base stations and received by said plurality of antennas; and identify the undesired co-channel downlink signals having a strongest interference level,
wherein the control module is configured to select between two alternative weights tuning based on highest signal plus interference to noise ratio (SINR) by:
tuning said plurality of tunable receiving antennas so as to maximize a total average power of said desired signals; and
tuning said plurality of tunable receiving antennas so as to minimize a total average power of the identified undesired co-channel downlink signals having the strongest interference level.

2. The UE receiving system according to claim 1, wherein the UE receiving system is a multiple inputs multiple outputs (MIMO) receiving system having number N channels, wherein each of the channels is associated with one of the beamformers and wherein the total number of said plurality of tunable receiving antennas is $M=\Sigma_{j=1}^{N}K_j$ wherein $K_j$ is a number of tunable antennas for the $j_{th}$ beamformer, wherein M is greater than N.

3. The UE receiving system according to claim 2, wherein the UE is configured to tune the receiving antennas of a beamformer with K antennas, wherein K may be different for each beamformer, by:
choosing for all beamformer antennas i (1 to K), amplitudes $\alpha_i=1$ and phases $\Phi_i \in A$, wherein A is a finite set of discrete phases, so as to maximize the total average power of the desired signals;
choosing for all beamformer antennas i (1 to K), amplitudes $\alpha_i=1$ and phases $\Phi_i \in A$ so as to minimize the total average power of the undesired co-channel downlink signals having the strongest interference level;
comparing the measured SINR for both sets of phases, one set including the phases for a maximizing the total average power of the desired signals, and the other set including the phases for minimizing the total average power of the undesired signals; and
selecting the set of phases that yields the highest measured SINR.

4. The UE receiving system according to claim 3, wherein for each beamformer the total average power of the desired signals is $PWR_{Signal}$ and defined as:

$$PWR_{Signal}=W_{BF}^{H}H_{S}W_{S}W_{S}^{H}H_{S}^{H}W_{BF},$$

wherein $H_S$ is a K×P signal channel matrix from the P transmit antennas to the beamformer's K receive antennas,
wherein $W_S$ is a P×U weight matrix applied to the signal by the transmitter, wherein U≤P, and
wherein $W_{BF}$ is a K×1 conjugate beamformer weight vector.

5. The UE receiving system according to claim 4, wherein for each beamformer the total average power of the undesired co-channel downlink signals having the strongest interference level is $PWR_{Interference}$ and defined as:

$$PWR_{Interference}=W_{BF}^{H}H_{I}W_{I}W_{I}^{H}H_{I}^{H}W_{BF},$$

wherein $H_I$ is a K×L interference channel matrix from the L antennas of the strongest interfering base station to the beamformer's K receive antennas, and
wherein $W_I$ is an L×L weight matrix applied to the interference by the transmitter.

6. The UE receiving system according to claim 5, wherein both phase and amplitude are selected by:
choosing for all beamformer antennas i (1 to K), amplitudes $\alpha_i \in B$, wherein B is a finite set of discrete amplitudes, and phases $\Phi_i \in A$, wherein A is a finite set of discrete phases, so as to maximize $PWR_{Signal}$;
choosing for all beamformer antennas i (1 to K), amplitudes $\alpha_i \in B$ and phases $\Phi_i \in A$ so as to minimize $PWR_{interference}$; and
comparing the measured SINR for both sets of best amplitudes and phases and decide for those that yield the highest measured SINR.

7. The UE receiving system according to claim 1, wherein $W_x$ denotes the beamformer antenna weights selected for improving the desired signals, and $W_y$ denotes the beamformer antenna weights selected for reducing the strongest interference, and wherein the control module is further configured to measure and compare SINR for $W_x$ and $W_y$; wherein in a case that the SINR for $W_y$ is greater than the SINR for $W_x$ then $W_y$ is selected, wherein otherwise, $W_x$ is used temporarily or until it is determined that updated interference estimation may be available.

8. A wireless User Equipment (UE) receiving system comprising:
two or more beamformers, each beamformer having a plurality of tunable receiving antennas; and
a control module configured to:
carry out a periodic, non-continuous channel estimation on a plurality of desired and undesired co-channel downlink signals which are transmitted from different base stations and received by said plurality of antennas; and
determine the undesired co-channel downlink signals having a strongest interference level,
wherein the control module is configured to tune said plurality of tunable receiving antennas so as to maximize a ratio between a total average power of: said desired signals, and a combination of said undesired co-channel downlink signals having the strongest interference level and an internal noise of the UE receiving system.

9. The UE receiving system according to claim 8, wherein the UE receiving system is a multiple inputs multiple outputs (MIMO) receiving system having number N channels, wherein each of the channels is associated with one of the beamformers and wherein the total number of said plurality of tunable receiving antennas is $M=\Sigma_{j=1}^{N}K_j$ wherein $K_j$ is a number of tunable antennas for the jth beamformer, wherein M is greater than N.

10. The UE receiving system according to claim 9, wherein for each beamformer the SINR is defined as $$SINR = \frac{PWR_{Signal}}{PWR_{Interference+Noise}} = \frac{W_{BF}^{H}H_{S}W_{S}W_{S}^{H}H_{S}^{H}W_{BF}}{W_{BF}^{H}[H_{I}W_{I}W_{I}^{H}H_{I}^{H}+C]W_{BF}+\sigma_{n}^{2}}$$

and wherein the UE is configured to tune the receiving antennas of a beamformer with K antennas, wherein K may be different for each beamformer, by choosing for all beamformer antennas i (1 to K), amplitudes $\alpha_i \in B$, wherein B is a finite set of discrete amplitudes, and phases $\Phi_i \in A$, wherein A is a finite set of discrete phases, so as to maximize the SINR,
wherein $H_S$ is a K×P signal channel matrix from the P transmit antennas to the beamformer's K receive antennas,
wherein $W_S$ is a P×U weight matrix applied to the signal by the transmitter, wherein U≤P,
wherein $W_{BF}$ is a K×1 conjugate beamformer weight vector, wherein $H_I$ is a K×L interference channel matrix from the L antennas of the strongest interfering base station to the beamformer's K receive antennas, wherein $W_I$ is an L×L weight matrix applied to the interference by the transmitter, wherein C is the covariance matrix of the external noise, and wherein $\sigma_n^2$ is the variance or power of the UE internal noise.

11. The UE receiving system according to claim 8, wherein $W_x$ denotes the beamformer antenna weights selected for improving the desired signals, and $W_y$ denotes the beamformer antenna weights selected for maximizing the power ratio between the desired signals and strongest interference plus internal noise, and wherein the control module is further configured to measure and compare SINR for $W_x$ and $W_y$; wherein in a case that the SINR for $W_y$ is greater than the SINR for $W_x$ then $W_y$ is selected, wherein otherwise, $W_x$ is used temporarily or until it is determined that updated interference estimation is available.

12. A method comprising:

receiving wireless signals from a plurality of transmit antennas via beamformers with a plurality of tunable receiving antennas;

carrying out a periodic, non-continuous channel estimation on a plurality of desired and undesired co-channel downlink signals which are transmitted from different base stations and received by said plurality of tunable receiving antennas;

determining the undesired co-channel downlink signals having a strongest interference level, and selecting based on highest SINR between:
 (i) tuning said plurality of tunable receiving antennas so as to maximize a total average power of said desired signals; and
 (ii) tuning said plurality of tunable receiving antennas so as to minimize a total average power of the determined undesired co-channel downlink signals having the strongest interference level.

13. The method according to claim 12, wherein the tuning of the antennas of a beamformer with K antennas, wherein K may be different for each beamformer, is carried out by:

choosing, for all beamformer antennas i (1 to K), amplitudes $\alpha_i \in B$, wherein B is a finite set of discrete amplitudes, and phases $\Phi_i \in A$, wherein A is a finite set of discrete phases, so as to maximize the total average power of the desired signals;

choosing, for all beamformer antennas i (1 to K), amplitudes $\alpha_i \in B$ and phases $\Phi_i \in A$, so as to minimize the total average power of the undesired co-channel downlink signals having the strongest interference level;

comparing the measured SINR for both sets of best amplitudes and phases; and selecting the set of amplitudes and phases that yields the highest measured SINR.

14. A method comprising:

receiving wireless signals from a plurality of transmit antennas via beamformers with a plurality of tunable receiving antennas;

carrying out a periodic, non-continuous channel estimation to a plurality of desired and undesired co-channel downlink signals which are transmitted from different base stations and received by said plurality of tunable receiving antennas;

determining the undesired co-channel downlink signals having a strongest interference level; and tuning said plurality of tunable receiving antennas so as to maximize a ratio between a total average power of a) said desired signals and b) a combination of said undesired co-channel downlink signals having the strongest interference level and an internal noise of the UE receiving system.

15. The method according to claim 14, wherein for each beamformer the SINR is defined as $$SINR = \frac{PWR_{Signal}}{PWR_{Interference+Noise}} = \frac{W_{BF}^H H_S W_S W_S^H H_S^H W_{BF}}{W_{BF}^H [H_I W_I W_I^H H_I^H + C] W_{BF} + \sigma_n^2}$$

and wherein said tuning is carried out for each beamformer by choosing for all beamformer antennas i (1 to K), amplitudes $\alpha_i \in B$, wherein B is a finite set of discrete amplitudes, and phases $\Phi_i \in A$, wherein A is a finite set of discrete phases, so as to maximize the SINR, wherein $H_S$ is a K×P signal channel matrix from the P transmit antennas to the beamformer's K receive antennas, wherein $W_S$ is a P×U weight matrix applied to the signal by the transmitter, wherein U≤P, wherein $W_{BF}$ is a K×1 conjugate beamformer weight vector, wherein $H_I$ is a K×L interference channel matrix from the L antennas of the strongest interfering base station to the beamformer's K receive antennas, wherein $W_I$ is an L×L weight matrix applied to the interference by the transmitter, wherein C is the covariance matrix of the external noise, and wherein $\rho_n^2$ is the variance or power of the UE internal noise.

* * * * *